April 21, 1953

J. E. WHITE 2,635,465

MEANS OF MEASURING THE MAGNITUDE OF TORQUE
STRAIN SETUP IN A MASS OF MATERIAL

Filed Aug. 15, 1949

JUD E. WHITE,
INVENTOR.

BY James M. Abbett

ATTORNEY

Patented Apr. 21, 1953

2,635,465

UNITED STATES PATENT OFFICE 2,635,465

MEANS OF MEASURING THE MAGNITUDE OF TORQUE STRAIN SET UP IN A MASS OF MATERIAL

Jud E. White, Long Beach, Calif., assignor to Martin-Decker Corporation, Long Beach., Calif., a corporation of Delaware Application August 15, 1949, Serial No. 110,248

4 Claims. (Cl. 73—136)

This invention relates to a means of measuring the magnitude of torque strain set up in a mass of material.

In the operation of testing the strength of an article and in ascertaining the torque strain to which an article is being subjected it is desirable to provide some simple means for measuring and indicating this strain when the article being measured is in operation without interrupting the operation. It is the principal object of the present invention therefore to provide means for sensing torque impulses occurring in a mass of material and for accurately indicating or recording the magnitude of these impulses.

The present invention contemplates the provision of means whereby an element may be secured to a mass of material in a relatively immovable zone and whereby another element may be secured to a mass of material in a movable zone subjected to torque strain. The relatively fixed and movable elements being associated with pneumatic sensing means whereby the magnitude of torque in the mass may be detected and measured either by visual indicating means or mechanical recording means.

The present invention is illustrated by way of example in the accompanying drawings in which.

Figure 1:
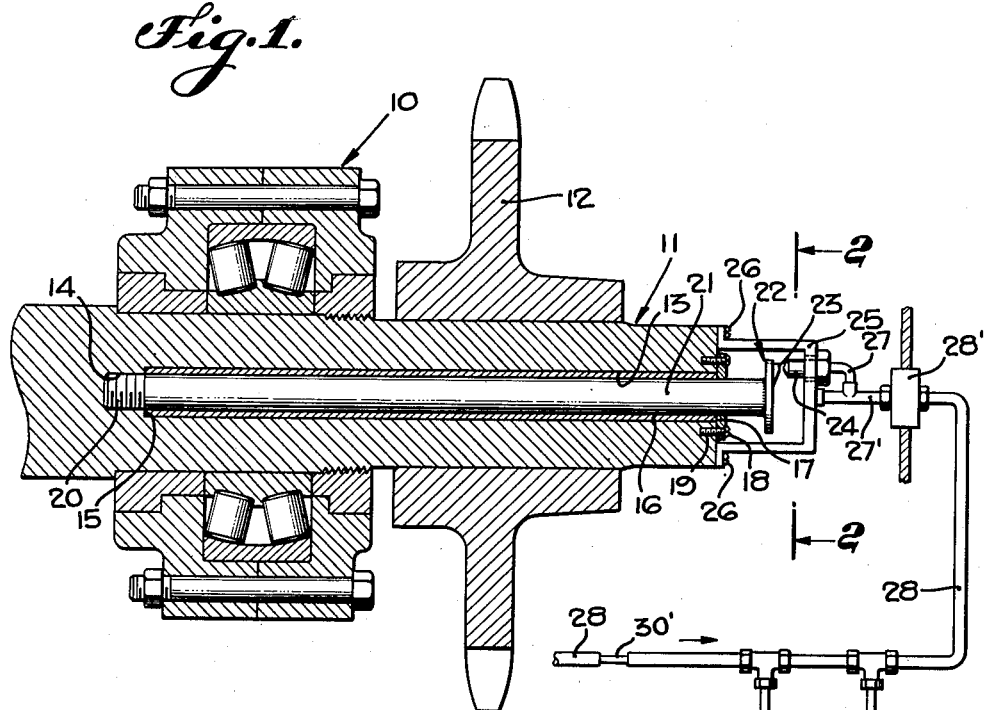
Figure 1 is a fragmentary view in central longitudinal section showing the application of the present invention to a drive shaft such as a drive shaft of a well drilling rotary table.
Figure 2:
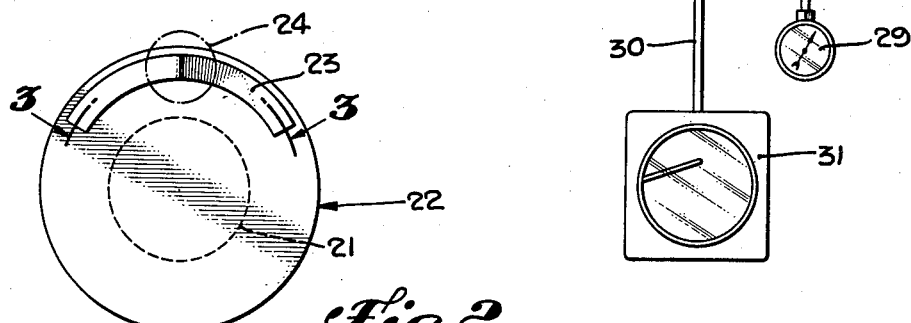
Fig. 2 is a view in end elevation showing the testing tool with which the present invention is concerned as seen on the line 2—2 of Fig. 1.

It is to be understood that the present measuring instrument may be employed in measuring torque magnitude exerted in any mass. However, in the present instance the invention is illustrated and described as being used on the drive shaft of a rotary well table. It will of course be understood that this is only one example of the uses to which the structure of the invention may be put and the method practised.

Referring more particularly to the drawing, 10 indicates the main bearing of a rotary well table within which a drive shaft 11 is rotatably supported. Mounted upon this drive shaft is a suitable driven member, such for example as a sprocket wheel 12. The rotation of the shaft 11 by the power applied by the sprocket tends to create torque in the shaft and it is the object of the present invention to measure the magnitude of this torque. It will be understood that the invention may be applied to any mass which tends to resist rotation and to which power is applied tending to produce rotation and to set up torque strain within the mass. In order to practise the invention it is desirable to drill a hole 13 longitudinally of the shaft 11. The end of the hole or bore 13 is reduced in diameter at 14 and is internally threaded. Held within the bore 13 and terminating at a shoulder 15 is a bushing 16. The bushing 16 is tubular and terminates at its outer end in a flange 17. The flange abuts against the end of the shaft 11 and is secured in position by cap screws and bolts 18 which are threaded into bores 19 formed in the end of the shaft 11. Extending through the bushing 16 and terminating in the threaded end 20 is a sensing shaft 21. The major length of the shaft is provided with a rotating fit within the bushing 16 by which bushing the shaft is held against lateral movement. It is intended that the length of the shaft 21 shall be greater than the length of the bushing 16 so that it will extend beyond the end of the bushing flange 17 and will also be threaded into the threaded bore 14. Furthermore, it is to be pointed out that the section modulus of the portion of the shaft 11 with relation to that of the sensing shaft 21 is such as to insure that torque force applied to the relatively tubular end of the shaft 11 will produce gyration while the sensing shaft 21, which is fixed to the relatively solid mass of the drive shaft 11 by the threaded section 20 and threaded bore 14, will be relatively devoid of any moment of gyration. Thus when torque force is applied to the relatively tubular end of the drive shaft 11 this end of the drive shaft may have a slight gyrating motion while the sensing shaft 21 remains relatively motionless. It is of course understood that the two shafts are considered broadly to rotate in unison when driven through the sprocket 12.

Figure 3:
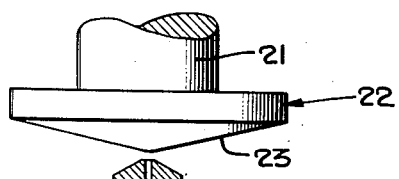
Fig. 3 is a view in section and elevation as seen on the arcuate line 3—3 of Fig. 2 and indicates a sensing cam contour and a nozzle associated therewith.

The end of the sensing shaft 21 is designed to extend beyond the end of the flange 17 on the bushing 16. This end is preferably formed with a cam member or disk 22. The cam disk may have a peripheral cam face, or the cam may be formed as a disk with a suitable cam face 23 protruding from the face of the disk. The contour of the cam face may be shaped as indicated in Fig. 3 of the drawings where the face is formed with a gradually projecting swell portion terminating at its opposite end in the end plane of the cam disk 22. It is understood that as here shown the end face of the disk is in the plane normal to the longitudinal axis of the sensing shaft 21. The device may also be constructed so that the cam disk 22 is inclined to the normal plane of the longitudinal axis of the sensing shaft, thus providing a structure having the functions of a well known mechanical element called a "wobble plate." In any event the peripheral or projecting surface 23 of a cam carried by the cam disk 22 is intended to move toward or away from the discharge end of a nozzle 24. The nozzle 24 is here shown as mounted within a bracket or housing 25 which is fixed to the end of the drive shaft 11 by screws 26 and which embraces the projecting end of the sensing shaft 21 and its cam disk 22. The nozzle is connected to a feed pipe and is formed with a restricted orifice which projects a jet of air under pressure against the cam face 23 of the cam. This nozzle is connected by a conduit 27 to a pipe 27' which in turn connects with the source of fluid under pressure through a supply pipe 28 with an air compressor bracket (not shown) through a rotary seal 28'. The end of the pipe 27' at a point beyond the connection of the conduit 27 therewith is closed. The air under compression delivered through the pipe therefore is forced outwardly through the nozzle and a jet of air impinges against the surface of the cam shoulder 23. It is obvious that the closer the cam shoulder is to the discharge end of the nozzle the greater will be the back pressure built up in the supply pipe 28. This pressure is indicated by a gauge 29 which is of usual construction and will indicate any variation in back pressure which is produced by change in relationship of the face 23 of the cam disk 22 with the nozzle 24. If desired a conduit 30 may be connected with the supply pipe 28 at a point between the source of fluid under pressure and the gauge 29 so that a supply of air will be provided to a recording gauge 31 which may be of any desired type. It is also desirable to interpose a flow bean or restricted orifice 30' between the inlet end of pipe 28 and pipe 30. An air filter or pressure reducer may be used if desired.

In order to practise the present invention, for example in testing the torque strain created in a rotary table drive shaft, the hole 13 is drilled longitudinally of the shaft 11 and a threaded bore 14 is formed at the inner end thereof. The bushing 16 is then placed within the bore 13 and is secured by screws 18 which pass through the flanges 17 of the bushing. The sensing shaft 21 is then positioned within the bushing 16 and its end 20 is screwed into the threaded bore 14. The bracket or housing 25 is then fastened in position by the screws 26 so that the nozzle 24 will register with the cam 23. Power is delivered to the sprocket 12 through some suitable connection, it being understood that any other type of drive may be used to impart rotation to the shaft. Air under pressure is then delivered from a pressure source through the supply pipe 28. In actual practice air at 20 p. s. i. is delivered to the pipe 28. As will be seen in Fig. 1 of the drawings, the pipe 28 is divided into two sections which are connected by a rotating coupling 28'. It is obvious that the pipe 27' and the drive shaft 11 should be longitudinally aligned so that the shaft and pipe will have a common axis. The shaft 11 may then rotate around this axis and will at the same time carry the housing 25 with it, and will rotate the sensing shaft 21. Due to the load which is imposed upon the main body of the drive shaft 11, which shaft portion is substantially rigid, and due to the fact that there is less rigidity in the end portion of the drive shaft 11 within which the bore 13 occurs, it is obvious that there will be a lag in rotational movement between the cam disk 22 and the housing 25 and its nozzle 24. This will cause the discharge end of the nozzle to move along the surface of the cam face 23 and will result in varying the back pressure created in the supply pipe 28. The magnitude of the back pressure will be indicated by a movement of the hand on the gauge 29. It is obvious that the dial of the gauge may be calibrated so that a suitable measurement will be indicated, which measurement will at the same time indicate the amount of torque stress set up in the shaft 11 under a given load and with the predetermined application of power.

Due to the fact that the supply pipe 28 accumulates a back pressure by the operation of the nozzle 24 and the cam 23, and for the further reason that the restricted member 30' acts so that the nozzle orifice will not allow enough airflow to build up a back pressure in pipe 28 and at the other end of the pipe 28 when the nozzle 24 is closed, this will insure that the escape of air is insignificant as compared with the airflow through the orifice of the nozzle 24. This results in building up the back pressure almost to the value of the supply pressure.

It will thus be seen that the structure here disclosed is decidedly simple in its construction and operation, and that by its use it is possible to ascertain torque resistance and torque strains set up in a mass of material which will be indicated by a visual reading or recording.

While I have shown a preferred apparatus embodying my invention, it is to be understood that various changes might be made in the combination of elements shown for practising the invention by those skilled in the art without departing from the spirit of the invention as claimed.

Having thus described my invention, what I claim and desire to secure by Letters Patent is:

1. Means for measuring the torque strain set up in a rotary shaft, one end of which shaft is restrained by a load and to the other end of which shaft torque driving force is applied, said shaft being formed at its driving end with a central bore whereby the driving end will have a lesser torque moment than the driven end, a cam shaft extending freely into said bore and fixed to the mass of the shaft contiguous to the load bearing end, a support fixed upon the end of the drive shaft to rotate with the shaft around its longitudinal axis, a cam carried by the cam shaft in a position beyond the end of the drive shaft, a nozzle carried by the support and formed with a discharge orifice which is located eccentrically of the axis of rotation of the shaft, said cam having a contour whereby relative rotary movement between the nozzle and the cam will change the spacing between the discharge orifice of the nozzle and the surface contour of the cam, means for delivering fluid under constant pressure to said nozzle continuously, and pressure responsive means indicating variation in pressure occurring within the delivery means as produced by back pressure caused by variation in the spacing between the nozzle orifice and the cam contour.

2. A device for measuring the torque strain set up in a shaft between two points at one of which points a torque driving force is applied to said shaft, and at the other of which points a torque load is applied to said shaft to resist the rotation thereof, said device comprising: a substantially torque free member fixed at one end thereof to said shaft at one of the said points and extending parallel to and concentric with said shaft to the other of said points, a support member fixed upon said shaft adjacent said other point, a cam provided on one of said members and concentrically related to said shaft and having a face the contour of which slopes away from a plane surface of rotation formed about the axis of said shaft, a nozzle carried by the other member and having a discharge orifice aligned to bear on said cam face whereby a jet discharged from said orifice will impinge upon said face and the twisting of said shaft will cause a variation in the space between the mouth of said orifice and said cam face, means for delivering fluid under constant pressure to said nozzle, and pressure responsive means indicating variations in pressure occurring within said fluid delivery means and produced by variations in the back pressure caused by said orifice being spaced different distances from said cam face.

3. A combination as in claim 2 in which said nozzle is mounted with its orifice parallel with the axis of said shaft, and in which said cam is in the form of an arc concentric with said axis, the face aforesaid of said cam sloping relative to a radial plane normal to said axis.

4. A combination as in claim 2 in which said nozzle is mounted with its orifice parallel with the axis of said shaft, and in which said cam is in the form of an arc concentric with said axis, the face aforesaid of said cam sloping relative to a radial plane normal to said axis in opposite directions from the high point of the cam.

JUD E. WHITE.

References Cited in the file of this patent

UNITED STATES PATENTS

| Number | Name | Date |
|---|---|---|
| 2,044,461 | Beck | June 16, 1936 |
| 2,150,377 | Keinath | Mar. 14, 1939 |
| 2,268,783 | Tate | Jan. 6, 1942 |
| 2,329,121 | Lamberger et al. | Sept. 7, 1943 |
| 2,358,894 | Volet | Sept. 26, 1944 |
| 2,455,285 | Versaw | Nov. 30, 1948 |